US007721192B2

(12) United States Patent
Milic-Frayling et al.

(10) Patent No.: US 7,721,192 B2
(45) Date of Patent: May 18, 2010

(54) USER INTERFACE FOR A RESOURCE SEARCH TOOL

(75) Inventors: Natasa Milic-Frayling, Cambridge (GB); Ralph Sommerer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1235 days.

(21) Appl. No.: 10/361,355

(22) Filed: Feb. 10, 2003

(65) Prior Publication Data

US 2004/0100510 A1 May 27, 2004

Related U.S. Application Data

(63) Continuation-in-part of application No. 10/306,276, filed on Nov. 27, 2002, now abandoned.

(51) Int. Cl.
*G06F 17/00* (2006.01)
*G06F 3/00* (2006.01)
*G06F 15/16* (2006.01)

(52) U.S. Cl. .................. 715/230; 715/231; 715/243; 715/246; 715/254; 715/273; 715/760; 715/772; 715/864; 707/3; 709/246

(58) Field of Classification Search ............. 707/3
See application file for complete search history.

(56) References Cited

U.S. PATENT DOCUMENTS

| 5,877,766 | A | * | 3/1999 | Bates et al. ............ 715/854 |
| 5,915,249 | A | * | 6/1999 | Spencer .................. 707/5 |
| 5,940,821 | A | * | 8/1999 | Wical ..................... 707/3 |
| 6,006,217 | A | * | 12/1999 | Lumsden ................ 707/2 |
| 6,055,538 | A | * | 4/2000 | Kessenich et al. ...... 707/101 |
| 6,243,091 | B1 | | 6/2001 | Bertis |
| 6,271,840 | B1 | * | 8/2001 | Finseth et al. .......... 715/513 |
| 6,301,580 | B1 | * | 10/2001 | Eigel-Danielson ...... 707/102 |
| 6,351,767 | B1 | * | 2/2002 | Batchelder et al. ..... 709/219 |
| 6,593,944 | B1 | * | 7/2003 | Nicolas et al. .......... 715/744 |
| 6,674,901 | B1 | * | 1/2004 | Simske et al. .......... 382/180 |
| 6,675,159 | B1 | * | 1/2004 | Lin et al. ............... 707/3 |
| 6,731,316 | B2 | | 5/2004 | Herigstad et al. |
| 6,822,664 | B2 | | 11/2004 | Vale |
| 6,829,605 | B2 | * | 12/2004 | Azzam ................... 707/5 |
| 6,832,353 | B2 | | 12/2004 | Itavaara et al. |
| 6,904,427 | B1 | * | 6/2005 | Hagiwara et al. ....... 707/3 |
| 6,928,461 | B2 | * | 8/2005 | Tuli ...................... 709/203 |

(Continued)

OTHER PUBLICATIONS

Woodruff et al, "Using Thumbnails to Search the Web", Mar. 2001, ACM Press, Conference on Human Factors in Computing Systems—Proceedings of the SIGCHI conference on Human factors in computing systems, pp. 198-205.*

(Continued)

*Primary Examiner*—Tadesse Hailu
*Assistant Examiner*—Alvin H Tan

(57) ABSTRACT

A resource search tool provides important context assistance and control for viewing resources on an incompatible display, such as a handheld display. A handheld device, for example, does not provide a large enough display space to provide a quick and comfortable search tool interface for a user. The search tool provides annotated search result pages and search result target pages to signify search hits in one or more documents or logical unites of the individual documents. In addition, progress indicators are provided to inform the user of the progress of the background layout and linguistic processing used to annotate for each search result target page.

37 Claims, 15 Drawing Sheets

U.S. PATENT DOCUMENTS

| | | | |
|---|---|---|---|
| 6,934,702 B2* | 8/2005 | Faybishenko et al. | 707/3 |
| 6,976,226 B1* | 12/2005 | Strong et al. | 715/788 |
| 7,007,008 B2* | 2/2006 | Goel et al. | 707/3 |
| 7,047,033 B2* | 5/2006 | Wyler | 455/552.1 |
| 7,069,506 B2* | 6/2006 | Rosenholtz et al. | 715/526 |
| 7,103,594 B1* | 9/2006 | Wolfe | 707/5 |
| 7,177,948 B1* | 2/2007 | Kraft et al. | 709/246 |
| 7,216,121 B2* | 5/2007 | Bachman et al. | 707/3 |
| 7,225,407 B2* | 5/2007 | Sommerer et al. | 715/738 |
| 7,243,300 B1* | 7/2007 | Metcalfe et al. | 715/201 |
| 7,254,571 B2* | 8/2007 | Brown et al. | 707/3 |
| 7,283,951 B2* | 10/2007 | Marchisio et al. | 704/9 |
| 7,287,214 B1* | 10/2007 | Jenkins et al. | 715/205 |
| 2002/0030699 A1 | 3/2002 | Van Ee | |
| 2002/0052916 A1 | 5/2002 | Kloba et al. | |
| 2002/0078043 A1 | 6/2002 | Pass et al. | |
| 2002/0087535 A1* | 7/2002 | Kotcheff et al. | 707/5 |
| 2002/0092001 A1* | 7/2002 | Fujikawa et al. | 717/136 |
| 2003/0135649 A1* | 7/2003 | Buckley et al. | 709/247 |
| 2003/0179239 A1 | 9/2003 | Lira | |
| 2004/0015481 A1* | 1/2004 | Zinda | 707/1 |
| 2004/0075671 A1 | 4/2004 | Vale et al. | |
| 2004/0095376 A1* | 5/2004 | Graham et al. | 345/716 |
| 2004/0095400 A1 | 5/2004 | Anderson et al. | |
| 2004/0100509 A1 | 5/2004 | Sommerer et al. | |
| 2004/0107403 A1* | 6/2004 | Tetzchner | 715/513 |
| 2004/0117353 A1* | 6/2004 | Ishag et al. | 707/3 |
| 2005/0022140 A1 | 1/2005 | Vale | |
| 2005/0055420 A1* | 3/2005 | Wyler | 709/217 |
| 2006/0026140 A1* | 2/2006 | King et al. | 707/3 |

OTHER PUBLICATIONS

Lin et al, "Discovering Informative Content Blocks from Web Documents", Jul. 2002, ACM Press, Conference on Knowledge Discovery in Data—Proceedings of the eighth ACM SIGKDD international conference on Knowledge discovery and data mining, pp. 588-593.*

* cited by examiner

USER INTERFACE FOR A RESOURCE SEARCH TOOL

RELATED APPLICATIONS

The present application is a continuation-in-part of U.S. patent application Ser. No. 10/306,276, filed Nov. 27, 2002 now abandoned entitled "WEB PAGE PARTITIONING, REFORMATTING AND NAVIGATION", specifically incorporated by reference herein for all that it discloses and teaches.

TECHNICAL FIELD

The invention relates generally to resource browsers, and more particularly to providing a user interface for a resource search tool.

BACKGROUND OF THE INVENTION

Most Web pages are designed for display on a desktop or laptop display screen. Such display screens have somewhat consistent sizes and aspect ratios, which allows the Web page designer to make certain assumptions about the layout of text, graphics, and logical sections of the Web page. For example, Web pages are designed to place advertisements, controls, links, text, and other content within the anticipated bounds of a desktop or laptop display screen.

One problem with this existing approach is that the incompatible sizes and aspect ratios of handheld devices or large screen displays do not accommodate a typical Web page designed for a desktop or laptop system. For example, FIG. 1 illustrates three parts of a Web page 100 as shown on a handheld device at different horizontal scroll points. An article 110 from Slate, an online magazine, is too wide to be displayed on a handheld device without horizontal scrolling. To read the article 110, the user must scroll horizontally back and forth as each line of text is read. This approach has very negative usability characteristics, including the loss of spatial context perceivable by the user. Users are relatively comfortable with scrolling down to read text, but users are less comfortable with horizontal scrolling (back and forth), particularly with every line of text. Likewise, if the Web page is displayed on a large screen display, such as in a convention hall in which the display is zoomed in to make the text large enough for the audience members to see, repeated horizontal scrolling is unworkable for most audiences.

In addition, for Web pages with multiple sections of layout, such as the page shown in FIG. 3, multiple peripheral sections may take up valuable display real estate in a handheld device or large screen display. As shown by display 102 of FIG. 1, the inclusion of section 104 in the display 102 severely limits the amount of section 110 displayed in the first horizontal position, thereby contributing to the need to scroll horizontally in order to read the article in section 110.

The problem of viewing Web pages on a small screen, such as that of a handheld device or PDA, is particularly emphasized when a user is searching the Web. For example, when viewing the search results from a popular Web search engine, such as www.google.com, references or links to Web pages satisfying the specified search criteria are listed on the search results Web page. However, after selecting one of the links to a search result target page, it is difficult for a user to quickly find the search-criteria-satisfying elements (i.e., search hits) of the resulting Web page because of the small size of the handheld device's display. A zooming operation can help to make the text readable, but, with the display zoomed, portions of the search results target page are typically obscured and spatial context is lost. Again, inconvenient horizontal scrolling, for example, may be required to incrementally view the entire page. Therefore, the options of zooming and scrolling do not provide a convenient and comfortable user interface for a search tool.

SUMMARY OF THE INVENTION

Embodiments of the present invention solve the discussed problems by annotating search result target resources (e.g., search result target pages, documents, images) to highlight search hits in various portions or logical sections of each resource. In this manner, the issues of zooming and spatial context are separated to some extent. A zoomed out resource may be displayed to maximize the amount of the resource that can be viewed without scrolling, while providing hit annotations associated with each logical section. Thereafter, the logical section can be selected for viewing in a zoomed in, reformatted display.

In implementations of the present invention, articles of manufacture are provided as computer program products. One embodiment of a computer program product provides a computer program storage medium readable by a computer system and encoding a computer program that annotates a representation of a search result target resource identified in a resource search based on at least one search criterion. Another embodiment of a computer program product may be provided in a computer data signal embodied in a carrier wave by a computing system and encoding the computer program that annotates a representation of a search result target resource identified in a resource search based on at least one search criterion.

The computer program product encodes a computer program for executing on a computer system a computer process for annotating a representation of a search result target resource identified in a resource search based on at least one search criterion. The representation of the search result target resource is generated. A layout analysis of the search result target resource is performed to identify one or more logical sections of the search result target resource. A linguistic analysis of the search result target resource is performed. The representation of the search result target resource is annotated based on the linguistic analysis to indicate at least one logical section of the search result target resource includes an element that satisfies the at least one search criterion.

In another implementation of the present invention, a method of annotating a representation of a search result target resource identified in a resource search based on at least one search criterion is provided. The representation of the search result target resource is generated. A layout analysis of the search result target resource is performed to identify one or more logical sections of the search result target resource. A linguistic analysis of the search result target resource is performed. The representation of the search result target resource is annotated based on the linguistic analysis to indicate at least one logical section of the search result target resource includes an element that satisfies the at least one search criterion.

In yet another embodiment of the present invention, a resource search tool for annotating a representation of a search result target resource, identified in a resource search based on a search criterion, is provided. An image generator creates the representation of the search result target resource. A layout analysis module analyzes the layout of the search result target resource to identify one or more logical sections of the search result target resource. A linguistics analysis module performs linguistic analysis of the search result target resource. An annotation module annotates the representation of the search result target resource based on the linguistic analysis to indicate at least one logical section of the search result target resource includes an element that satisfies the at least one search criterion.

These and various other features as well as other advantages, which characterize the present invention, will be apparent from a reading of the following detailed description and a review of the associated drawings.

DETAILED DESCRIPTION OF THE INVENTION

Figure 1:
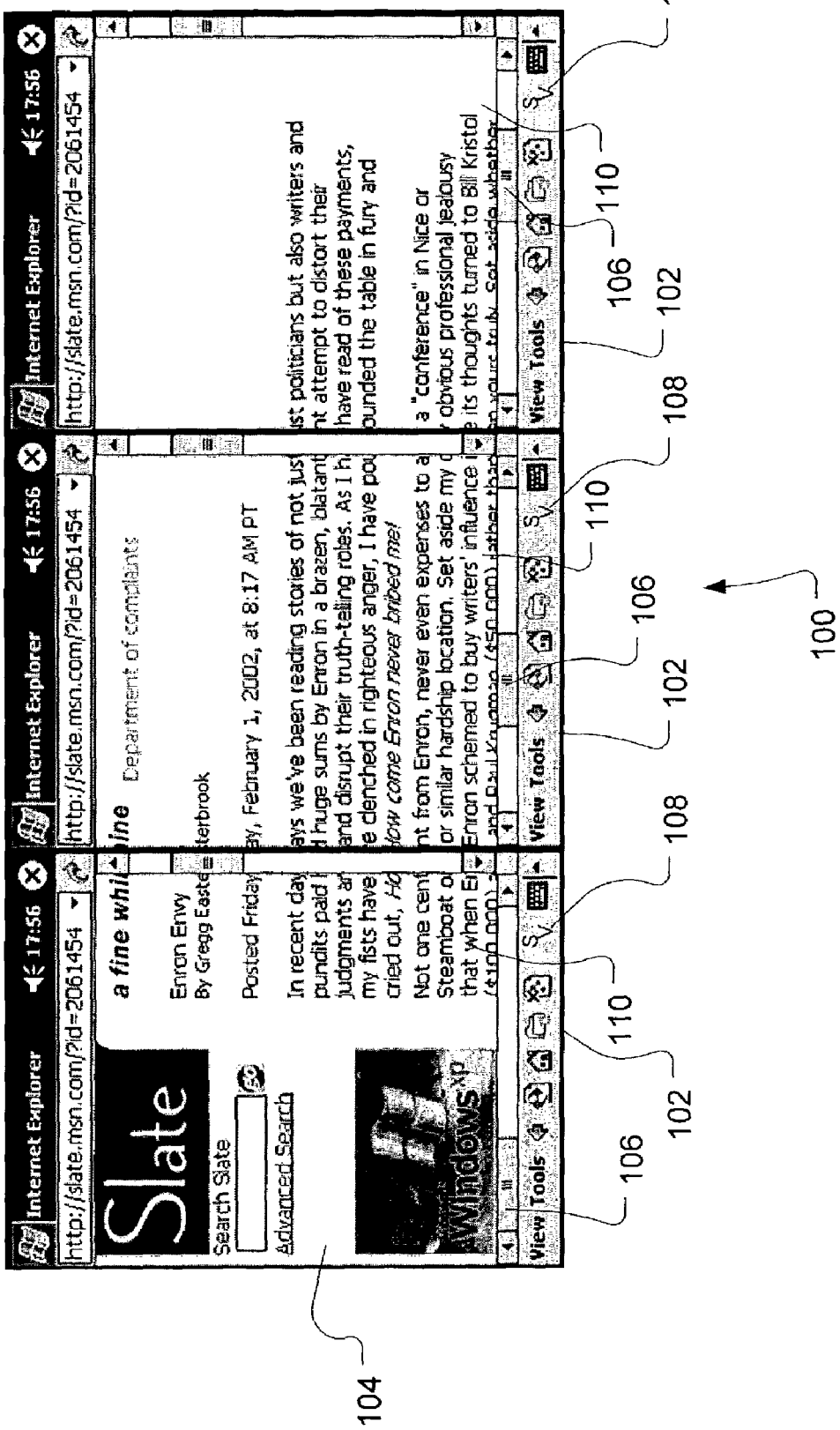
FIG. 1 depicts three parts of a Web page displayed on a handheld device at different horizontal scroll points in an embodiment of the present invention.

When a Web page is received for display on an "incompatible" display (i.e., a display which is incompatible with the Web page's design), a Web page partitioner/reformatter can partition the Web page and/or reformat logical sections of the Web page to fit within the incompatible display. For example, a Web page may be designed with complex display features that, while appropriate for a desktop or laptop display, make the Web page difficult to use on a handheld device or large screen display. By partitioning and/or reformatting logical sections of the Web page, each logical section can be displayed optimally within the previously incompatible display.

One specific example of a potentially incompatible display is a handheld device with a browser, such as a Personal Digital Assistant (PDA) device (e.g., an iPAQ handheld device from Compaq). Web pages designed for a desktop or laptop display tend to horizontally overrun the limited real estate on a handheld device's display. As such, a user would typically have to scroll the Web page back and forth along a horizontal axis to read text on the Web page. The Web page partitioner/reformatter allows the browser to display only the logical section in which the user is interested and can reformat the logical section to eliminate the need for horizontal scrolling.

Another example of a potentially incompatible display is a large screen display, such as may be used in a convention hall or conference room. Web pages designed for a desktop or laptop display tend to crowd the display with multiple logical sections. If the user zooms in to the Web page to maximize the size and readability of text on the Web page, other areas of the Web page may be obscured. Furthermore, depending on the amount of zoom required to make the text readable to the entire audience, the desired text may overrun the screen horizontally (i.e., along a horizontal axis), requiring the undesirable use of horizontal scrolling for each line of text. Again, the Web page partitioner/reformatter allows the browser to display only the logical section in which the user is interested and can reformat the logical section to eliminate the need for horizontal scrolling (e.g., using a font size that is more appropriate for a large audience in a convention hall).

Furthermore, on a Web page with multiple logical sections, a Web page partition map provides a convenient user interface for navigating among the logical sections of the Web page. A "zoomed out" image of the Web page is displayed on the device with partition lines designating individual logical sections. By selecting a logical section, a user can view the reformatted logical section in a new format that is compatible with the device's display.

Features of a zoomed out image and a zoomed in, reformatted image may be combined to provide both spatial context and convenient readability. A user interface for a resource search tool annotates search result target resources (e.g., search result target pages, documents, images) to highlight search hits in various portions or logical sections of each resource. In this manner, the issues of zooming and spatial context are both separated and preserved to some extent. A zoomed out resource may be displayed to maximize the amount of the resource that can be viewed without scrolling, while providing hit annotations associated with each logical section. Thereafter, the logical section can be selected for viewing in a zoomed in, reformatted display.

FIG. 1 depicts three parts of a Web page displayed on a handheld device at different horizontal scroll points in an embodiment of the present invention. The composite display 100 is configured to illustrate how a Web page, which is typically designed for display on a desktop or laptop display screen, may not adequately fit within the dimensions of a handheld device display screen 102. In fact, as can be seen on the depiction of three handheld device displays arranged side by side, the Web page visualized on FIG. 1 horizontally straddles the combined width of three displays.

Within the Web page illustrated in the composite display 100, a logical section 104 and a logical section 110 are displayed. The logical section 104 includes an image link displaying the word "Slate," a search applet, and an advertisement link for MICROSOFT WiNDOWS XP software. The logical section 110 includes an article entitled "a fine whine," by Gregg Easterbrook. In a typical Web page layout, logical sections are designated by a table layout defined in the HTML data received by the browser, however, other means of designating logical sections in a Web page, such as by using paragraphs, HTML forms, HTML frames, etc. are contemplated within the scope of the present invention.

In the illustration, a user must employ horizontal scrolling, using, for example, the horizontal scroll bar 106 to read a single line of text in the article of the logical section 110. By scrolling back and forth using the horizontal scroll bar 106, the user is able to read each line of text, although this interface is inconvenient and makes reading such articles difficult. One contributing factor to this inconvenience is the incompatibility between the initial design of the Web page (i.e., for a desktop or laptop display screen) and the handheld display screen dimensions and aspect ratio. Furthermore, the inclusion of the logical section 104 in the display, when the user is interested only in the article in logical section 110, further diminishes the amount of real estate available for displaying the article.

However, in the embodiment of the present invention shown in FIG. 1, a special "SmartView" ("$S_V$") control 108 allows the user to switch into SmartView mode for viewing the Web page on the handheld device. In another embodiment, the user switches into SmartView mode using a tap-and-hold menu by selecting the "SmartView" option.

Figure 2:
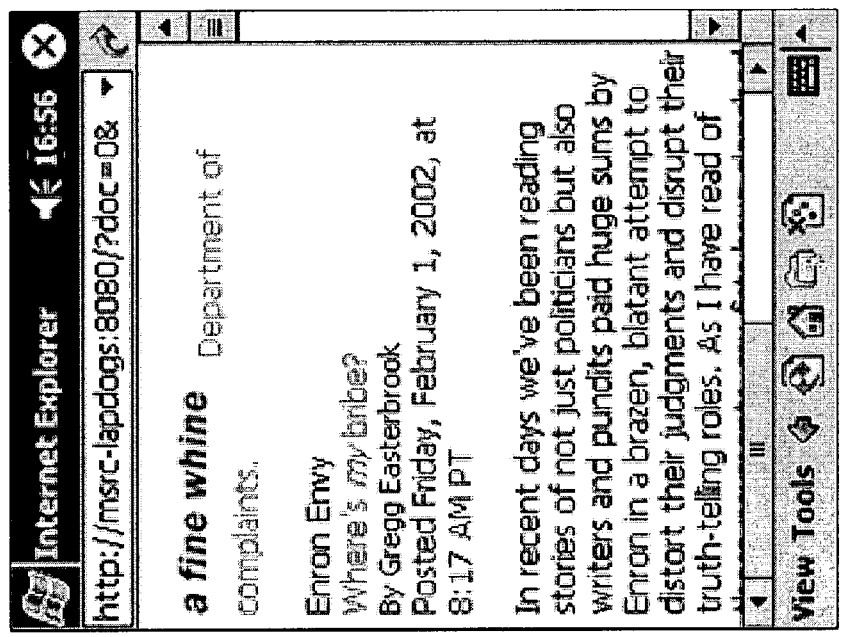
FIG. 2 depicts a logical section of the Web page partition reformatted to be compatible with the display on a handheld device in an embodiment of the present invention.

FIG. 2 depicts a logical section of the Web page partition reformatted to be compatible with the display of a handheld device in an embodiment of the present invention. The handheld device display 200 displays the logical section of the Web page from FIG. 1 that contained the article "a fine whine." However, the display 200 has omitted the logical section containing the image title "Slate," the search applet, and the advertisement. Furthermore, the logical section including the article has been reformatted to fit within the horizontal dimension (or axis) of the display 200. For example, the text of the article now wraps to new lines so that no horizontal scrolling is required. It is believed that vertical scrolling (i.e., scrolling along a vertical axis) is user-friendlier and is therefore preferable over horizontal scrolling. In this embodiment, the vertical axis is the "preferred axis" of scrolling.

However, the vertical axis need not always be the preferred axis of scrolling. In another embodiment, vertical scrolling may not be preferable. For example, if a logical section includes a panoramic image of a beach that span multiple horizontal screen areas (i.e., a short, wide photographic image), it may be preferable to size the image to fit in the full vertical dimension of the screen while requiring horizontal scrolling to view the full width of the image. In this embodiment, the horizontal axis is the preferred axis of scrolling.

In one embodiment, the user switches back to the partition map by pressing the "back" button on the browser. In another embodiment, a tap-and-hold menu can be opened that contains an option to return to the partition map. In a further embodiment, a special button is present that allows the user to jump back to the partition map. In yet another embodiment, the partition map is itself a graphical pop-up menu that the user can open, e.g., using a tap-and-hold activity or standard pull-down menus, and where logical sections can be chosen in a manner similar to textual options from a textual pop-up menu.

Figure 3:
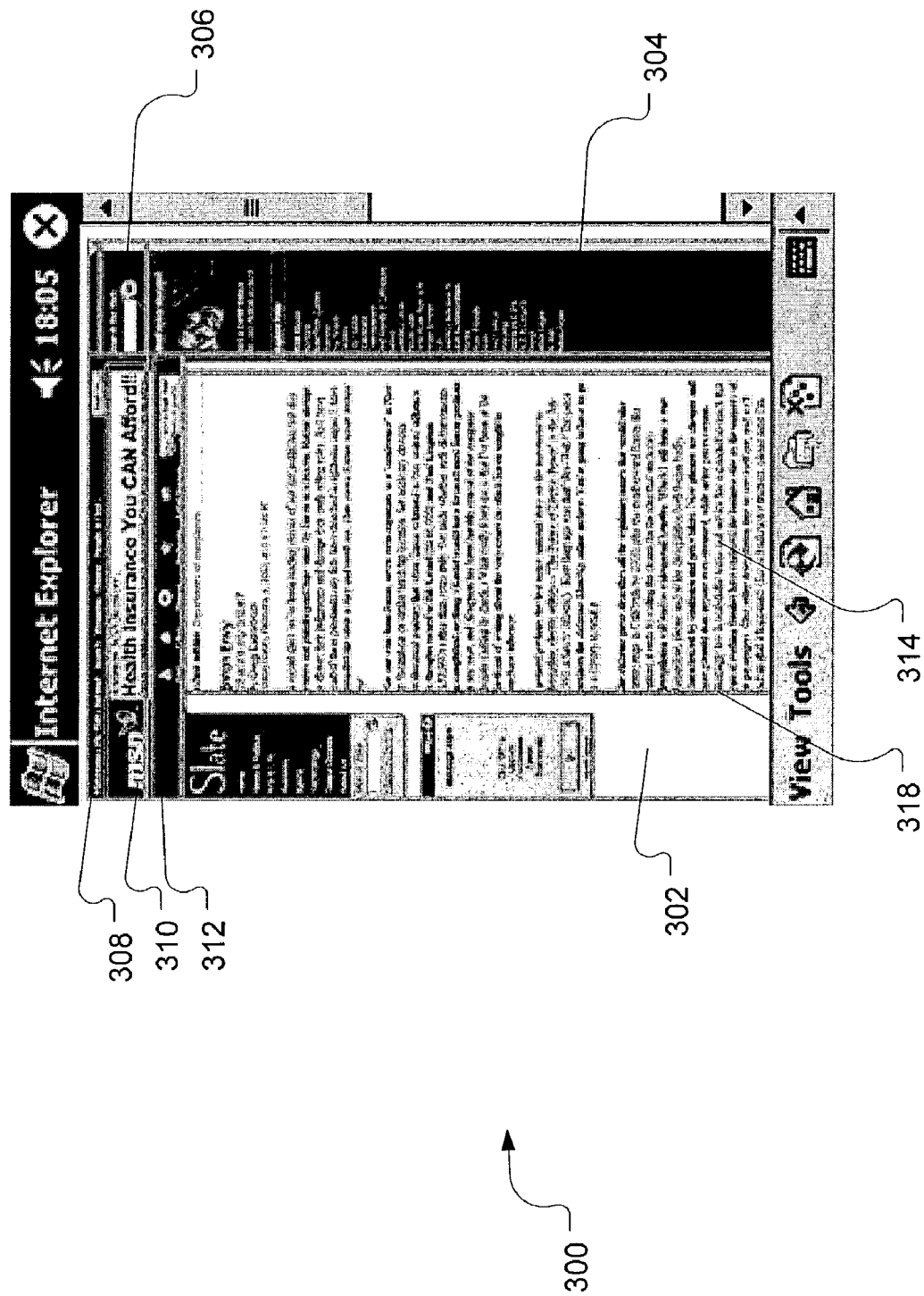
FIG. 3 depicts a Web page partition map in an embodiment of the present invention.

FIG. 3 depicts a Web page partition in an embodiment of the present invention. Whereas FIG. 1 displayed a Web page in its originally designed dimensions and aspect ratio (i.e., an example of "standard view" mode) and FIG. 2 illustrates a single logical section of the Web page reformatted to fit within the dimensions and aspect ratio of the handheld device (i.e., an example of "detailed view" mode), FIG. 3 illustrates a zoomed out version of the entire Web page in the handheld device display 300 that fits the width of the device and may require vertical scrolling (i.e., an example of the SmartView mode). In another embodiment, the scaling of the page shown in FIG. 3 is such that it fits the display both horizontally and vertically. Multiple logical sections are displayed in the zoomed out version of the Web page, as designated by partition lines, such as line 318. The exemplary logical sections 302, 304, 306, 308, 310, 312, and 314 are all designated by partition lines separating them from other logical sections.

The display 300 illustrates a Web page partition map that allows a user to select an individual logical section for viewing in the format shown in FIG. 2. A user may select a logical partition by a double tap of a stylus, a tap-and-hold operation using the stylus or some other pointing apparatus, or another selection means. Responsive to the selection, the browser displays the logical partition in a reformatted display as shown in FIG. 2.

The "detailed view" and "SmartView" modes provide important context assistance and control for viewing resources on an incompatible display, such as a handheld display. These concepts can be further applied to resource searching functions, including without limitation a Web search, an Internet search, a documents search, or a file search. A handheld device, for example, does not generally provide a large enough display space to quickly and comfortably display a search tool interface for a user. Search results returned from a search engine are typically designed for a desktop or laptop display and therefore require considerable horizontal and vertical scrolling on a handheld device to view the search results list. Even then, the text on a handheld device may be difficult to read with substantial zooming. In contrast, zooming in to read the text diminishes the context accessible from the overall search results list. For example, it is more difficult for a user to discern his or her current location in the search results list when most of the results are not visible, beyond the boundaries of the display. In an embodiment of the present invention, the user friendliness of the SmartView and detailed view configurations is combined with annotations that signify search hits on one or more documents or logical units of individual documents. In addition, progress indicators are added to the SmartView mode to inform the user of the progress of the background layout and linguistic processing use to generate the annotations. Such combinations, illustrated in the figures as a "SearchMobil" tool, provide easy readability (i.e., focus) in the detailed view mode while preserving context in the SmartView mode.

Figure 4:
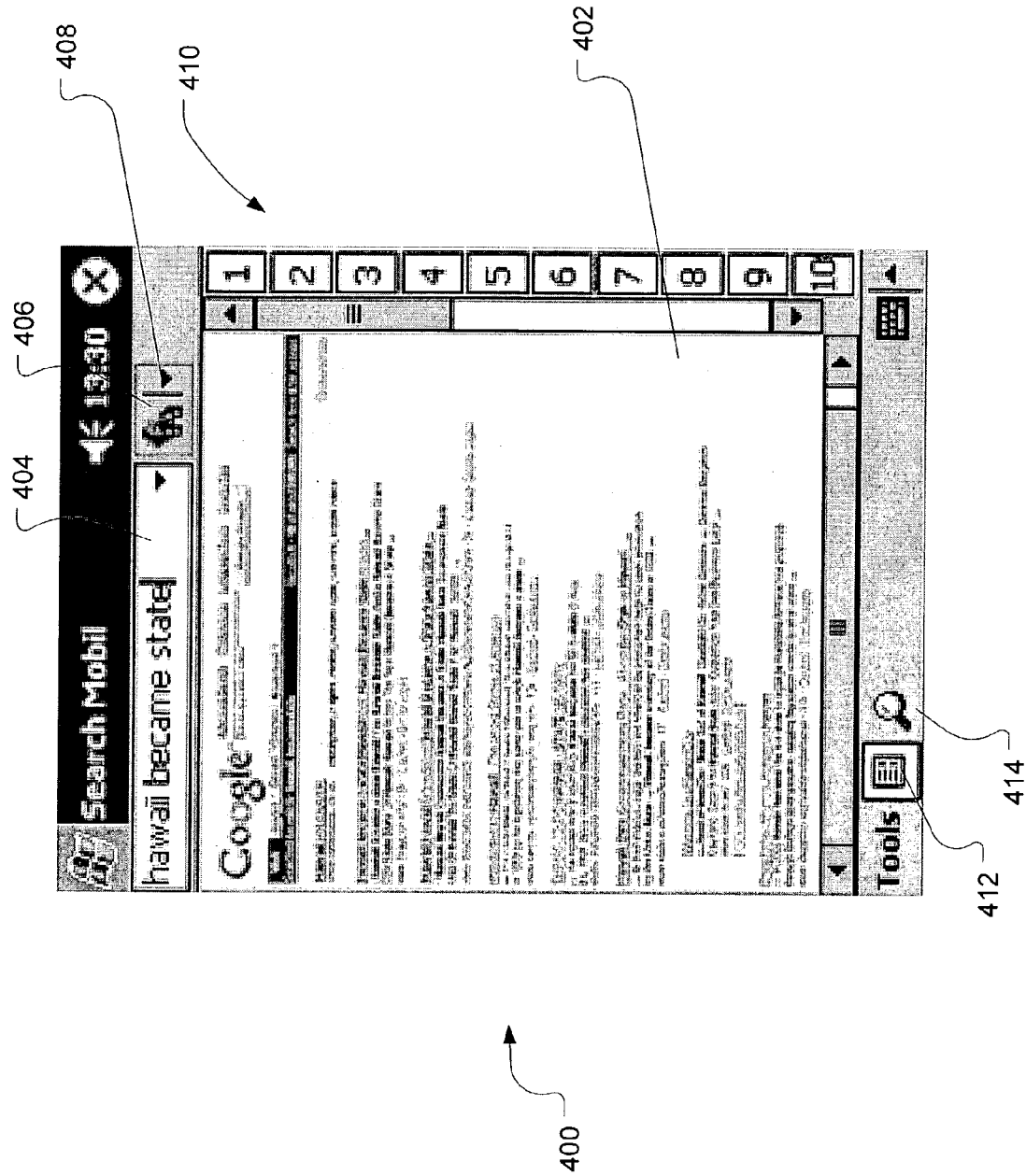
FIG. 4 depicts a search results Web page prior to completion of the analysis of any search results target pages in an embodiment of the present invention.

FIG. 4 depicts a search results Web page prior to completion of the background analysis of any search results target pages in an embodiment of the present invention. Although Web pages are primarily discussed with regard to the illustrated embodiments, any viewable and searchable resources (e.g., text documents, images, animations) may be operated on by embodiments of the present invention.

A handheld display 400 shows a search results Web page 402. A text box 404 receives a set of search criteria "hawaii became state", which is passed on to a search engine, such as www.google.com. The search engine performs the Web search and returns the search results shown in the search results Web page 402.

A Web search control 406 displays a globe and a pair of binoculars to indicate that the SearchMobil tool is in "Internet Search" mode (e.g., that the search will be performed on the Web). For example, one embodiment of the "Internet Search" mode causes search criteria entered by the user in the text box 404 to be passed to www.google.com in FIG. 4. Search criteria may include textual terms, shapes, images, etc. that a search engine may use to identify resources matching or containing matching elements with them. An alternative embodiment of the "Internet Search" mode may pass the search criteria to a file search tool that operates on the Web, FTP (file transfer protocol) sites, and other Internet-based systems. In one embodiment, the drop-down arrow 408 allows a user to select from a variety of search types. The search is executed by selecting the Web search control 406.

Progress tabs 410 are displayed along the side of the search results Web page 402. Each tab 410 corresponds to a search result in the search results Web page 402. Initially, when the search results Web page data is received from the search engine, the tabs 410 are displayed as white or un-patterned to indicate that background analysis of the search result target pages (i.e., those resource pages referenced in the search results Web page) has not yet been completed. It should be understood that the specific colors, patterns, or other visual characteristics described herein pertain to an exemplary embodiment; however, it should be clear that any distinguishing combinations of colors, patterns, or visual characteristics are contemplated within the scope of the present invention.

When highlighted, a SmartView icon 412 at the bottom of the handheld display 400 identifies that the handheld display 400 is in SmartView mode, with or without partition lines. In contrast, the magnifying glass icon 414, which is highlighted in FIG. 4, indicates that the handheld display 400 is in detailed view mode.

Figure 5:
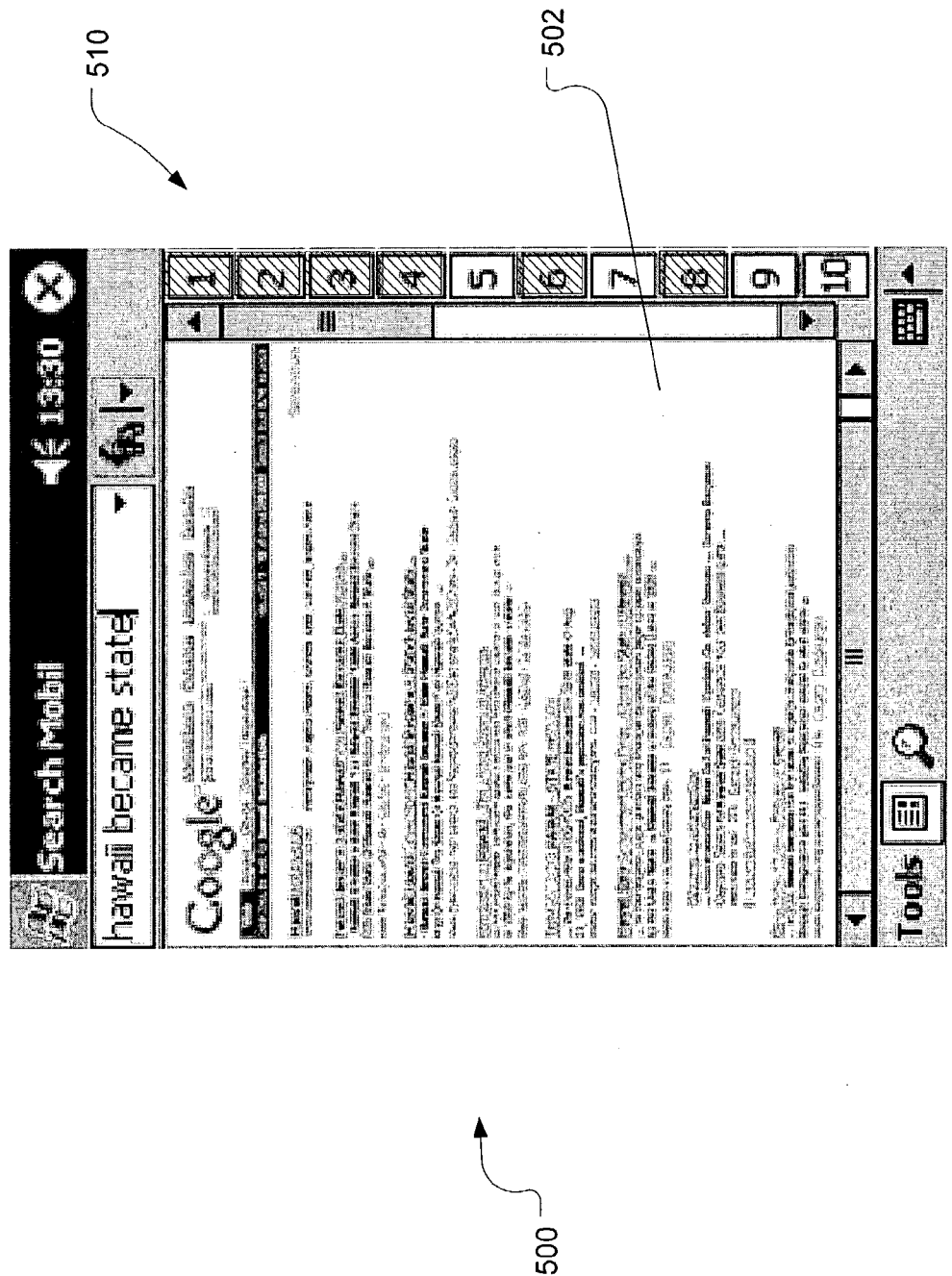
FIG. 5 depicts a search results Web page displaying progress in the analysis of search result target pages in an embodiment of the present invention.

FIG. 5 depicts a search results Web page displaying progress in the analysis of search result target pages in an embodiment of the present invention. A handheld display 500 shows a search results Web page 502. However, in contrast to the handheld display 400 in FIG. 4, some of the tabs 510, namely the tabs numbered in 1-4, 6, and 8, show completion indications. In the illustrated embodiment, the completion indication is shown by a diagonal pattern on a tab. In an alternative embodiment, completion indications are shown by changing the tab color to yellow to indicate that the analysis of the search result target page has been completed.

Alternative progress indicators may be employed within the scope of the present invention to indicate the progress of the background analysis of the search result target pages. Some exemplary progress indicators may include without limitation a set of colored bars, a checkerboard pattern in which spaces corresponding to completed target pages are filled in, and a translucent overlay over the search result entries themselves on the search results Web page.

Figure 6:
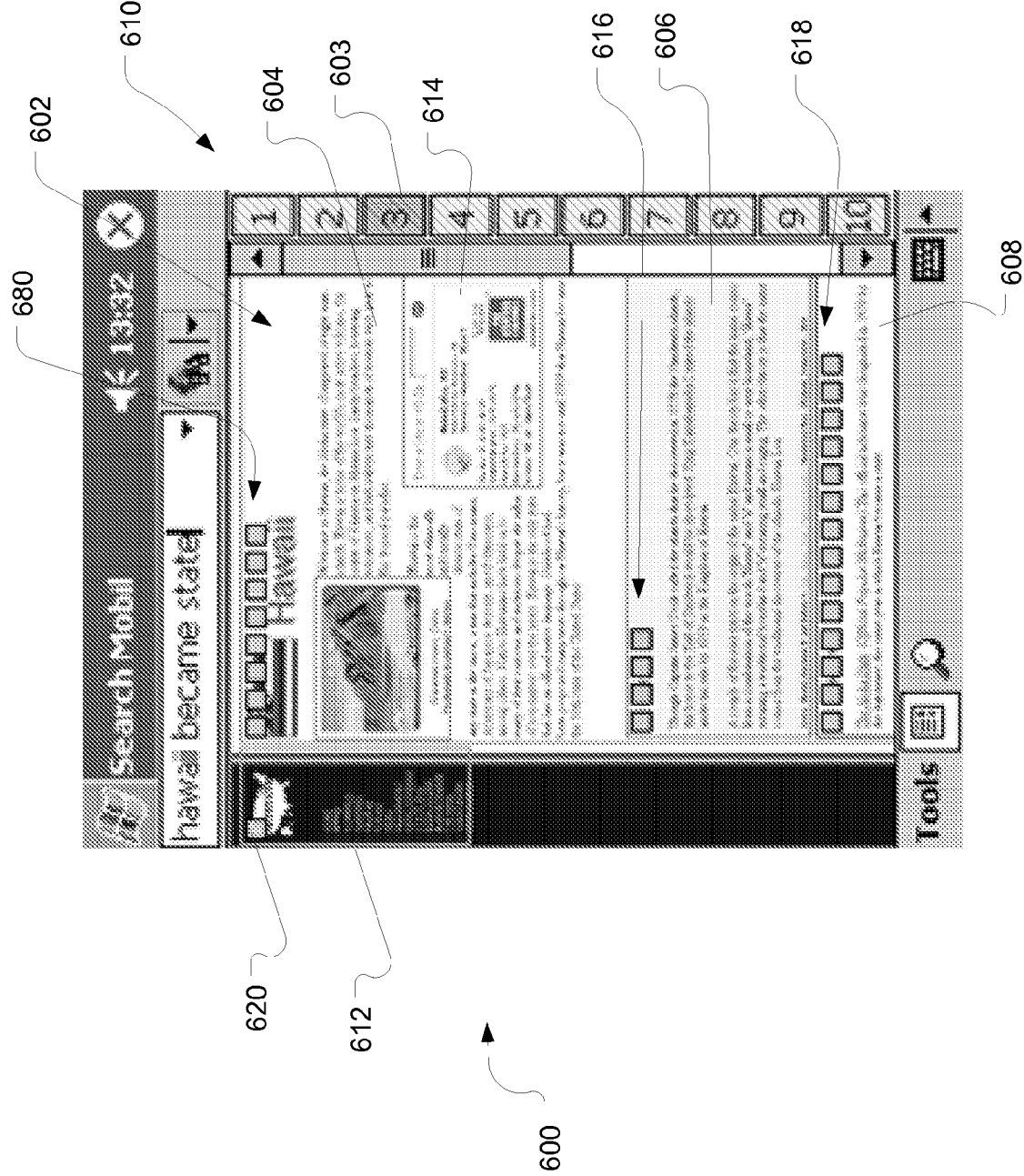
FIG. 6 depicts a selected search result target page with annotations in embodiment of the present invention.

FIG. 6 depicts a selected search result target page with annotations in embodiment of the present invention. A handheld display 600 shows an annotated SmartView mode display of the target page 602, which is associated with the third search result in the search results Web page of FIG. 5 (as shown by the highlighted or darkened tab 603).

"The SmartView mode display shows five annotated logical sections (604, 606, 608, 612, and 614) of the target page 602. Eight "hit" annotations 680 are displayed in the upper left hand corner of the logical section 604, indicating that analysis has determined that eight elements (e.g., terms) of the logical section 604 satisfy the search criteria "hawaii became state". Four "hit" annotations 616 are displayed in the upper left hand corner of the logical section 606, indicating that analysis has determined that four elements of the logical section 606 satisfy the search criteria in four locations. Likewise, the logical section 608 shows fourteen "hit" annotations 618, and the logical section 612 shows one "hit" annotation 620. Notice that the logical section 614 does not show any "hit" annotations. Therefore, no elements within the logical section 614 satisfied the search criteria."

Figure 7:
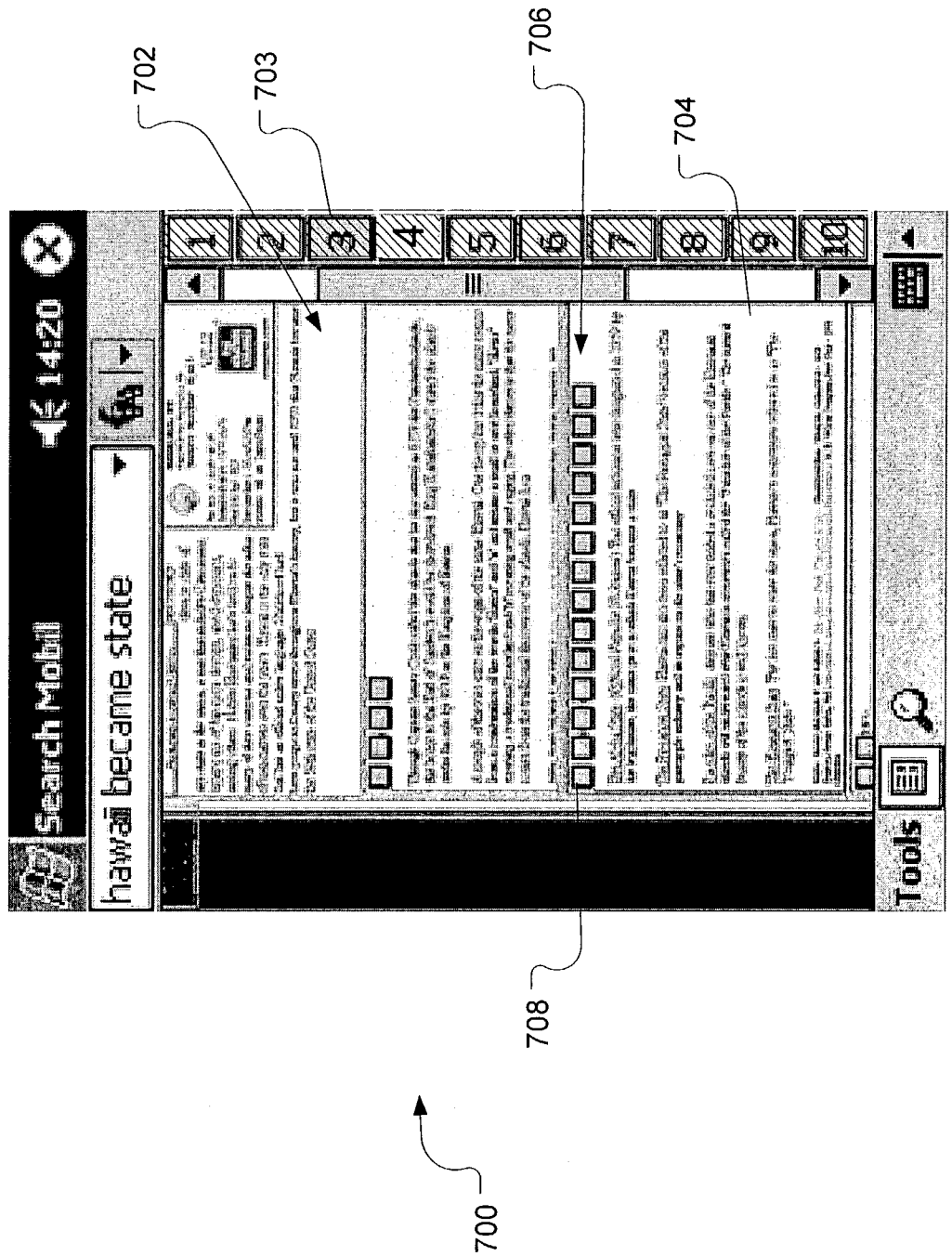
FIG. 7 depicts the logical section of a selected search result target page having the most search hits in an embodiment of the present invention.

FIG. 7 depicts the logical section of a selected search result target page having the most search hits in an embodiment of the present invention. A handheld display 700 shows an annotated SmartView mode display of the target page 702, which is associated with the third search result from the search results Web page of FIG. 5 (as shown by the highlighted or darkened tab 703). A logical section 704 shows fourteen "hit" annotations 706.

However, in the illustrated embodiment, the size of the font used to display the logical section 704 on the handheld display 700 substantially prevents a user from reading the text or discerning the location or context of the elements satisfying the search criteria. For at least that reason, the easily discernable hit annotations 706 (i.e., "presence hit annotations") provide the context information to help the user to identify the most relevant logical sections in the search result target page 702. In an alternative embodiment, hit annotations (i.e., "location hit annotations") are distributed throughout the logical section 704 so as to indicate both the presence and the location of a hit within the logical section 706. For example, hit elements within the page may be highlighted by a dark boundary, shading, etc. that can be seen in this view, even though the text cannot be read. In yet another alternative embodiment, a user may hover the mouse cursor over a hit annotation, whether a presence hit annotation or a location hit annotation, to invoke a "tool tip"-type display window that provides information about the hit. For example, a user hovering over hit annotation 708 may see a bubble or window displaying the entire sentence associated with the hit annotation 708.

An alternative annotation scheme may be used in an embodiment of the present invention. For example, in order not to obscure as much of the partition map with so many "hit" annotations, one embodiment merely indicates "no hits", "some hits", and "most hits". Other annotation schemes are contemplated within the scope of the present invention.

If the user wishes to access the logical section 704 in order to further view the text of the logical section 704, the user may select the logical section 704 (e.g., by double-clicking) to display a detailed view of the logical section 704.

Figure 8:
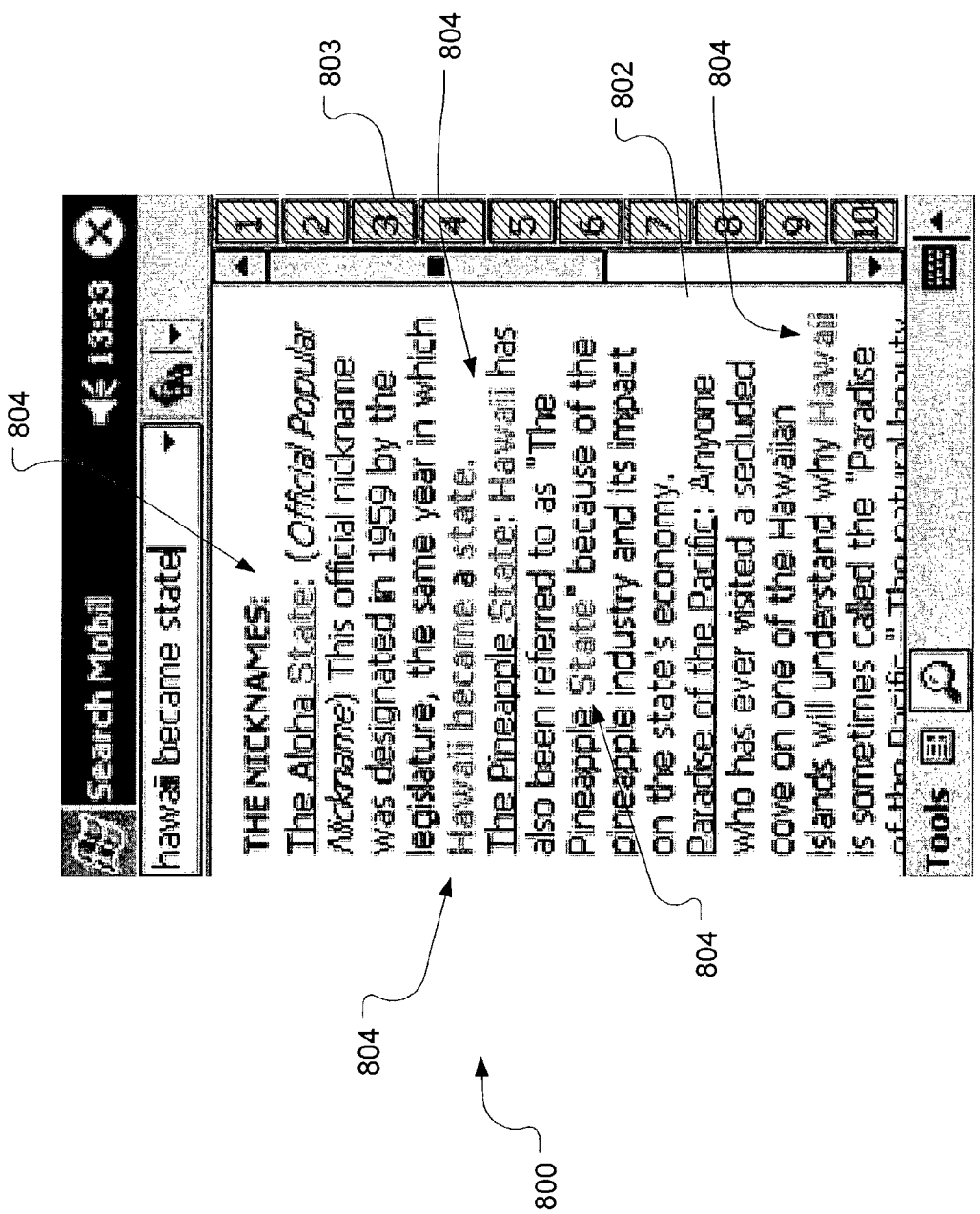
FIG. 8 depicts a reformatted view of a logical section of a selected search result target page with highlighted search terms in an embodiment of the present invention.

FIG. 8 depicts a reformatted view of a logical section of a selected search result target page with highlighted search terms in an embodiment of the present invention. A handheld display 800 shows the logical section within the dimensions of the handheld display 800 selected text is readable to the user. As can be seen in comparison to their presentation of the logical section 704 in the SmartView display of FIG. 7, the logical section 802 has been zoomed in and reformatted to fit within the horizontal dimensions of the handheld display 800. In addition, the elements (e.g., terms 804) within the logical section 802 that satisfy the search criteria have been highlighted (i.e., these terms appear lighter in a black and white representation of FIG. 8). In one embodiment, highlighted terms are colored (e.g. orange) to distinguish them from non highlighted terms (e.g., black). It should be understood, however, that any combination of distinguishing colors, patterns or other visual characteristics are contemplated within scope of the invention.

Figure 9:
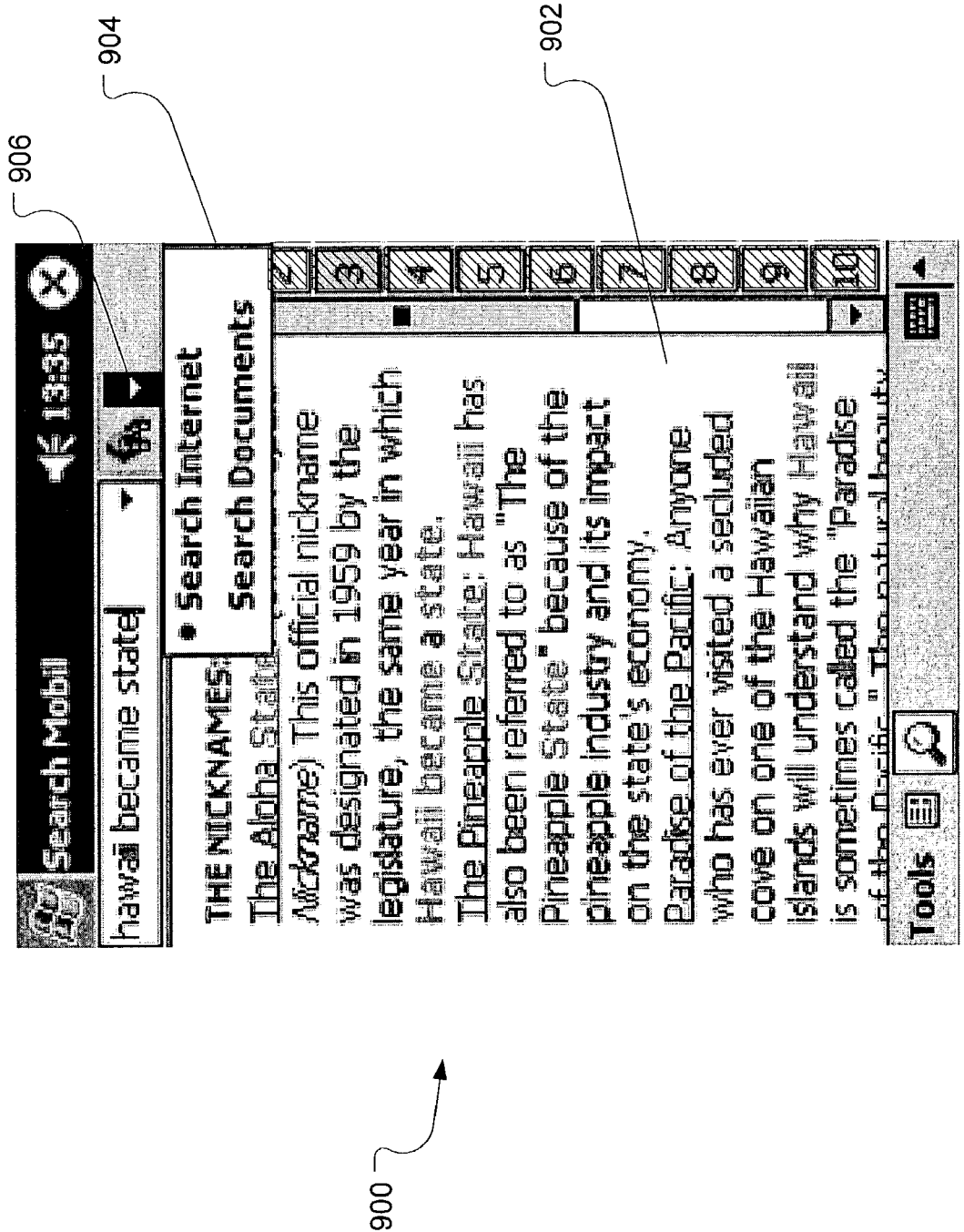
FIG. 9 depicts a control for toggling between a Web search and a document search in an embodiment of the present invention.

FIG. 9 depicts a control for toggling between a Web search and a document search in an embodiment of the present invention. A handheld display 900 shows a search result target page 902 and a drop-down menu control 906 that, when selected, displays search options 904. In the illustrated embodiment, one available search option is an "Internet search", such as a search involving a Web search engine (e.g., www.google.com). Another available search option is a "Documents search", in which search result target pages are searched based on a provided search criteria. Additional options, such as "search page", "search section" within the current page, and other similar features are fully supported by the described architecture and are contemplated within the scope of the present invention.

Figure 10:
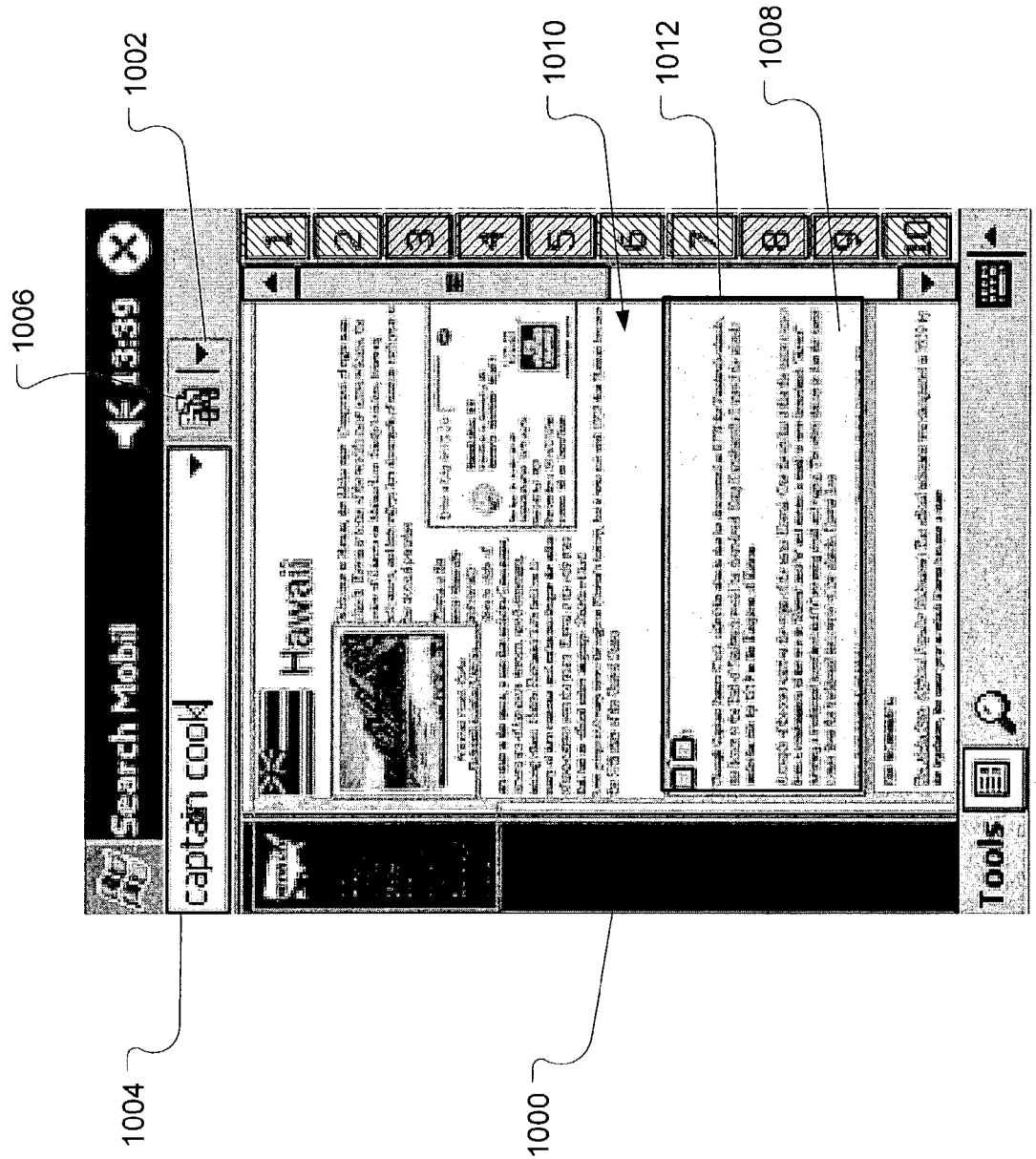
FIG. 10 depicts a search result target page showing results of a document search in an embodiment of the present invention.

FIG. 10 depicts a search result target page showing results of a documents search in an embodiment of the present invention. Starting again from the search results Web page 1000 for search result number '3', the user has selected a "Documents Search" via drop-down menu control 1002. The search criteria "captain cook" is received into the text box 1004, and a documents search has been executed by selection of the Documents Search button 1006.

As a result of the "Documents Search", the colors, patterns, or other visual characteristic of the tabs 3-5 and 8-9 are changed to indicate hits for the new search criteria within the corresponding search result target pages referenced in the search results Web page. The visual characteristics of tabs 1-2, 6-7, and 10 are unchanged because no hits were found for the corresponding target pages. To help differentiate the "hit" tabs and the "no hit" tabs in the black and white FIG. 10, top-left-to-bottom-right diagonals are shown for "hit" tabs and top-right-to-bottom-left diagonals are shown for "no hit" tabs. The dark tab 3 indicates that displayed target page 1010 is the third search result in the search results Web page (see e.g., FIG. 6). A logical section 1008 is shown as having the most hits satisfying the new search criteria "captain cook" within the target page 1010 (i.e., 2 hits). "Having the most hits" is designated in the target page 1010 by the dark border 1012 around the logical section 1008.

Figure 11:
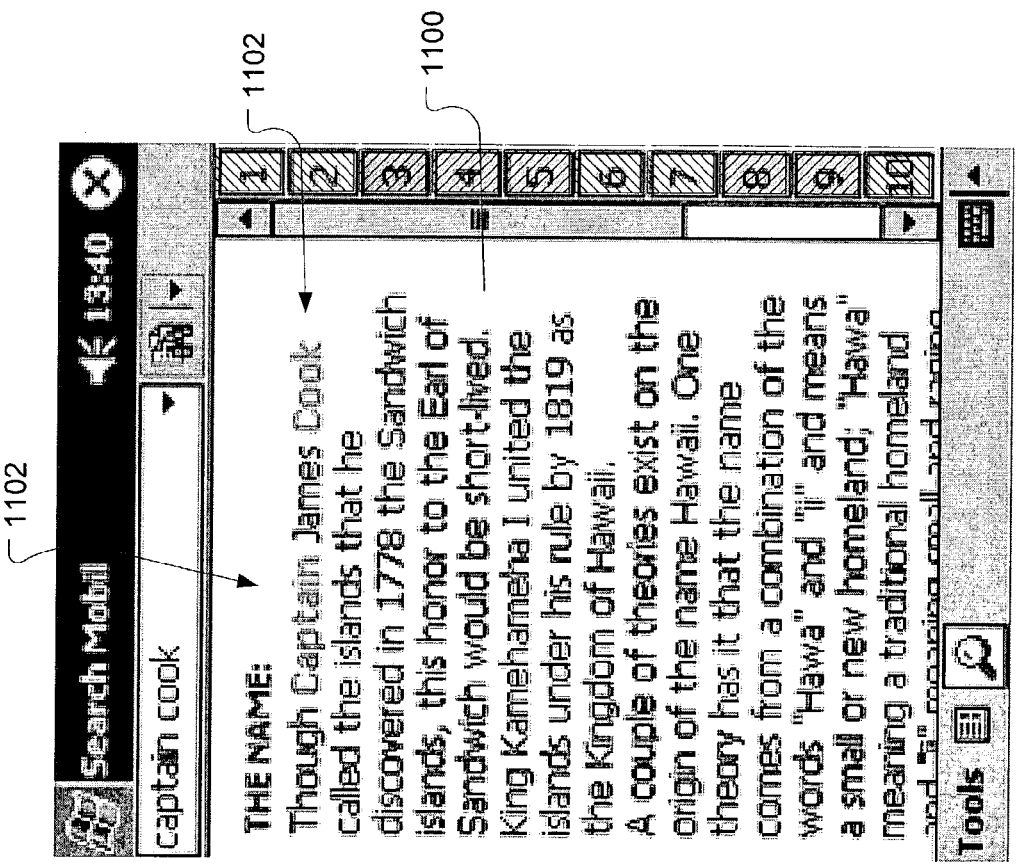
FIG. 11 depicts a reformatted view of a selected logical section in a document search mode in an embodiment of the present invention.

FIG. 11 depicts a reformatted view of a selected logical section in a document search mode in an embodiment of the present invention. By selecting the logical section 1008 from FIG. 10, the user may obtain a detailed view 1100 of the logical section 1008. In addition, the terms 1102 satisfying the new search criteria has been highlighted to make the hits more apparent to the user.

Figure 12:
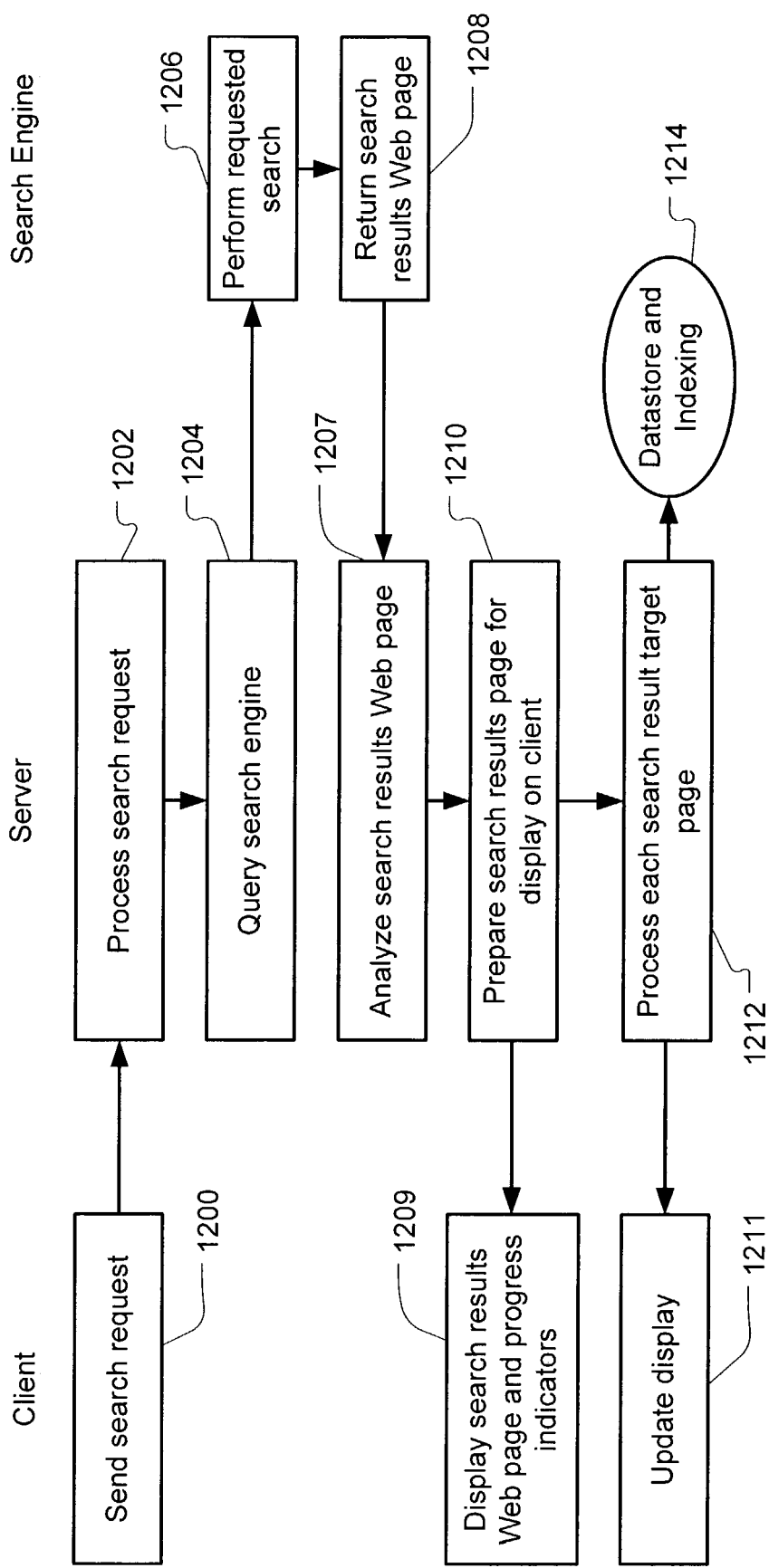
FIG. 12 illustrates operations for analyzing, thumbnail marking, and term highlighting in an embodiment of the present invention.

FIG. 12 illustrates operations for analyzing and generating search results in an embodiment of the present invention. A request operation 1200 sends a search request (e.g., from a user selecting a Web search in the SearchMobil display) to a server that initiates the search and analyzes the search results. In one embodiment of the present invention, the server is a proxy server, although in other embodiments the server may embody a server process on the client device or another server coupled to the network. Responsive to receiving the search request, the server processes the search request in processing operation 1202. Such processing may include without limitation formatting the search request for a specific search engine, performing linguistic analysis on the search request, and caching the search request.

A querying operation 1204 queries the search engine using the search criteria provided in the search request. For example, a querying operation 1204 may send the search criteria to www.google.com to perform the search. A search operation 1206 executes the search, and a result operation 1208 returns the search results to the server. In one embodiment, the search results take the form of a search results Web page, similar to the page shown in FIG. 4.

An analysis operation 1207 may analyze the search results Web page, such as to partition the logical sections. In one embodiment, the search results Web page is partitioned into logical sections, and a partition map is generated, such that target pages can be chosen via the partition map in addition to (or instead of) via the tabs on the right side of the display. In another embodiment, a (readable) summary page is created as a result of the analysis operation 1207, where short summaries of each of the target pages are listed. A preparation operation 1210 prepares the search results Web page for display on the client. In one embodiment, the preparation operation 1210 generates a thumbnail image of the search results Web page and adds progress tabs to the image. In another embodiment, some portion of the analysis operation 1207 may be performed in preparation operation 1210 so as to provide feedback to the user with the search results. For example, the search results may be annotated to indicate the number of hits for a given a search result or to identify dead links in the search results Web page. A dead link can be identified by an inability to download the target page corresponding to a given search result. In yet another alternative embodiment, the search results Web page is displayed in SmartView mode with partition lines. A display operation 1209 displays the search results thumbnail image in SmartView mode with progress tabs on the client.

The analysis and preparation of the displays in the SmartView and detailed view modes are described in detail in previously incorporated U.S. patent application Ser. No. 10/306,276, entitled "WEB PAGE PARTITIONING, REFORMATTING AND NAVIGATION". The analysis operation 1207 analyzes the document layout to identify the individual logical sections. In one embodiment, the document to be analyzed is laid out as if it was to be displayed on a desktop computer, i.e., with a page size of sufficient width that the elements in the page assume their "natural" specified size (e.g., 800 pixels wide).

In other alternatives, the analysis of the document layout may include discovery of other properties of the content of the logical sections that can be displayed on the partition map. For example, the partition map can indicate that a particular section contains a control element, such as a form or a search box. In such embodiments, a representation of the property (such as an icon or text label) may be displayed in the partition map in association with the logical section.

The document is partitioned into its individual logical sections by traversing the HTML document structure or HTML Document Object Model (DOM). The DOM is a hierarchical representation of an HTML document, where each node in the DOM represents either an HTML element or a piece of text. The children of the node are all the HTML element and text nodes that are completely contained in the corresponding HTML element representing the node (e.g., a node representing a row of an HTML table is a child node of the table node, and the table cells in that row, in turn, are children of the row node).

In one embodiment, at each element node in the DOM structure, it is determined whether the node represents one of the elements that the analysis is based upon, i.e., an HTML table, a form's element, etc. If so, and if the width that the element occupies on a page is laid out for a desktop computer display (as explained above), the element is bookmarked as a possible "logical section". If the element's width exceeds that of the target device screen (e.g., a handheld display screen) by a certain margin, processing continues with its children. Otherwise, the element's children are not further processed.

Whether a node is bookmarked as a logical section may be determined by a set of one or more predetermined rules. For example, if a table node is much wider and higher than the target device screen, the table node is not bookmarked as a logical section. Instead, all of the table node's cells are bookmarked as logical sections. In another example, if a table node's specified width (as an attribute to the HTML table element) is set to be 100% (i.e., the maximum available width) but, in its layout on the web page, the table node is within threshold amount wider than the target screen, then the table node is assumed to fit into the smaller target width of the handheld device's display. Therefore, the table node is not bookmarked as a logical section (because it "substantially" fits into the display) and neither are any of its cells.

The size of the target device screen is a parameter of both the analysis/partitioning operations and the reformatting operation (see below), and is made known to these processes in one of two ways, depending on whether these operations run locally on the device or remotely on a proxy server. If the process is running locally on the device, the dimensions of the device's screen are a system property that a program can access. Alternatively, the dimensions can be stored in and accessed from a global system storage, such as the system registry. If the process is running remotely on a proxy server, the program can access the dimensions of the target device and communicate them to the proxy server as part of the request to perform the analysis.

The result of the analysis/partitioning operation is a vector of nodes in the DOM that are the roots of logical sections. Each logical section is annotated by to the region that it occupies on the standard layout of the document. This annotation information is used in a subsequent operation to mark the logical sections in the partition map.

An analysis operation 1212 processes each search result target page and stores the analysis results in a cache 1214. The analysis data for each search result target page, which may include without limitation the downloaded target page, layout analysis results, a thumbnail image, linguistic analysis results, and statistics of linguistic features and searches, are stored in the cache 1214 to annotate the search result target page in SmartView mode when selected for viewing by the user. In addition, the cached data may be reused for different search sessions (e.g., a documents search, a single document search, a section (of a document) search, or a new Web search) later.

Figure 13:
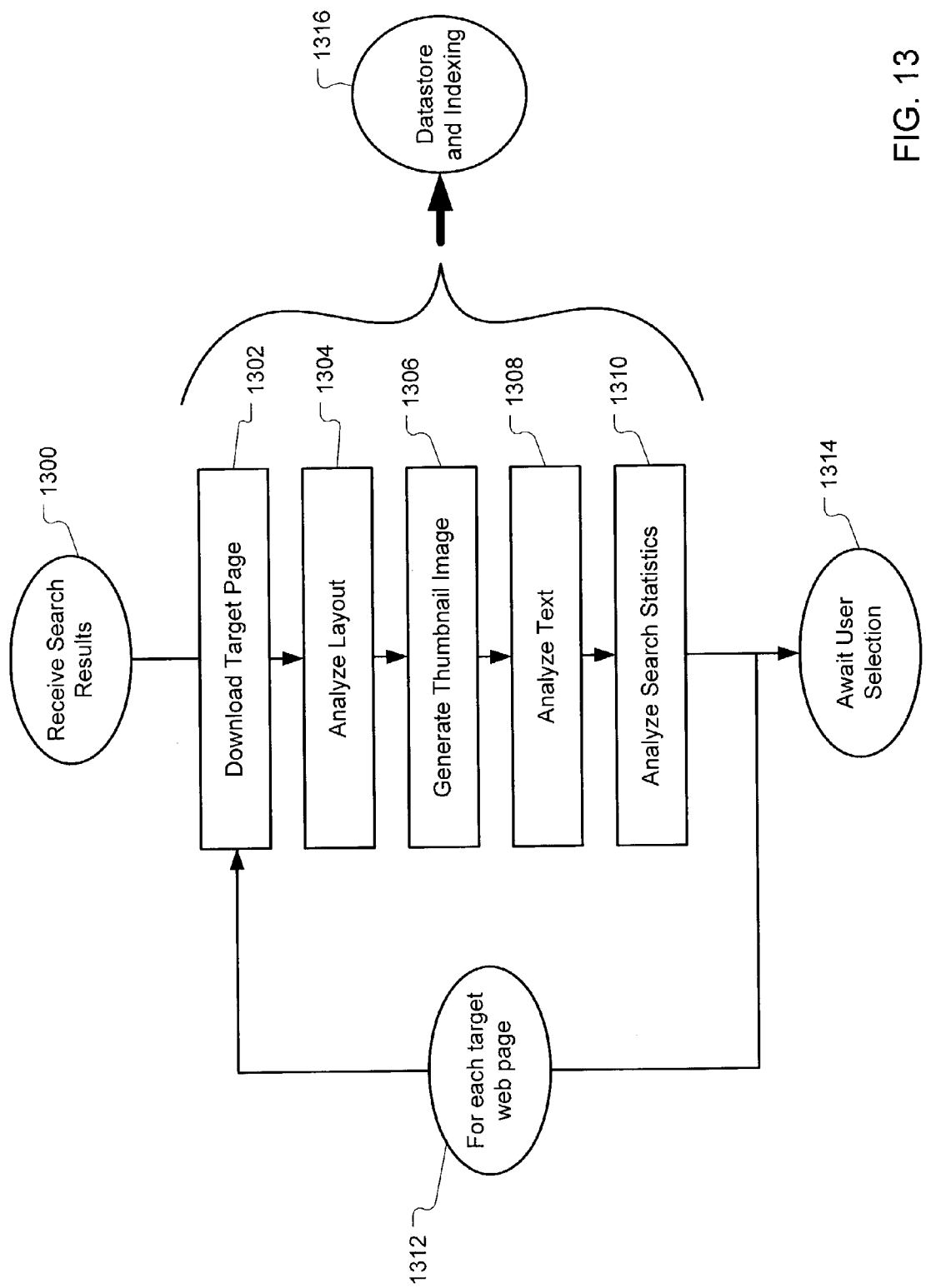
FIG. 13 illustrates detailed operations of the analyzing process in an environment of the present invention.

Exemplary detailed operations of the analysis operation 1212 are discussed with regard to FIG. 13. As each search result target page is processed in the analysis operation 1212, data is sent to the client to update the display of the progress tabs and any other annotations to the search results Web page in updating operation 1211. For example, as analysis of each target page completes, data is sent to display the search results Web page with a highlighted progress indicator corresponding to the completed target page. Likewise, any search results Web page annotations may also be set to the client. For example, the relative strength of the individual search results may be annotated into the thumbnail image of the search results Web page, such as in a translucent strength annotation overlay on each search result or a strength annotation in a corresponding progress tab. Strength refers to the relative quality of the search criteria matching for a given search result. In one embodiment, the greater number of hits in a given search result target page, the stronger the result.

FIG. 13 illustrates detailed operations of the analyzing process in an environment of the present invention. Search results are received in the receiving operation 1300. In one embodiment, the search results include the search results Web page received from the search engine. In alternative embodiments, the search results may include information processed in the preparation operation 1210 and the analysis data generated from the analysis operation 1207. A search results target page is downloaded from its resource location (e.g., the search engine) in download operation 1302. In one embodiment of the present invention, the target page is stored in the cache 1316.

An analysis operation 1304 analyzes the layout of the target page, in part to provide partitioning and reformatting information for the SmartView and detailed view modes. The layout analysis results are stored in the cache 1316 for later use. A thumbnail operation 1306 generates a thumbnail image from the target page for use in the SmartView display. The generated thumbnail image is stored in a cache 1316 for later use. A linguistics analysis operation 1308 analyzes the text in the target page and stores the linguistics analysis results in the cache 1316, in one embodiment including positional information associated with the linguistic features, for later use. Statistical properties of the linguistic features, such as frequency of the feature occurrence in the documents or logical units of the documents, or occurrences of the feature across the documents in a given set are stored in the cache. Based on the linguistic and statistical information about content elements of the documents, an inverted index is built and stored in the cache to support further searches. The inverted index may be associated with a page and/or with individual logical sections of a page. By providing granularity in the inverted index down to the logical section level, search statistics may be created that are associated with individual logical sections of the page.

Based on the linguistics analysis operation 1308, an analysis operation 1310 uses the inverted index and calculates the search statistics (e.g., how relevant or similar is the document or document portion, e.g., a logical section, is to the user query) in preparation for annotating each target page displayed in SmartView mode. In an exemplary implementation, the linguistics analysis operation 1308 includes statistical analysis of the content elements. The search statistics, such as relevance scores of an individual page or of individual sections of the page, can be used in annotating search hits to reflect the degree of relevance of a given hit or logical section. A looping operation 1312 repeats operations 1302, 1304, 1306, 1308, and 1310 for each target page referenced in the search results Web page. Having analyzed each result target page, the waiting operation 1314 awaits user selection of one of the search results.

Figure 14:
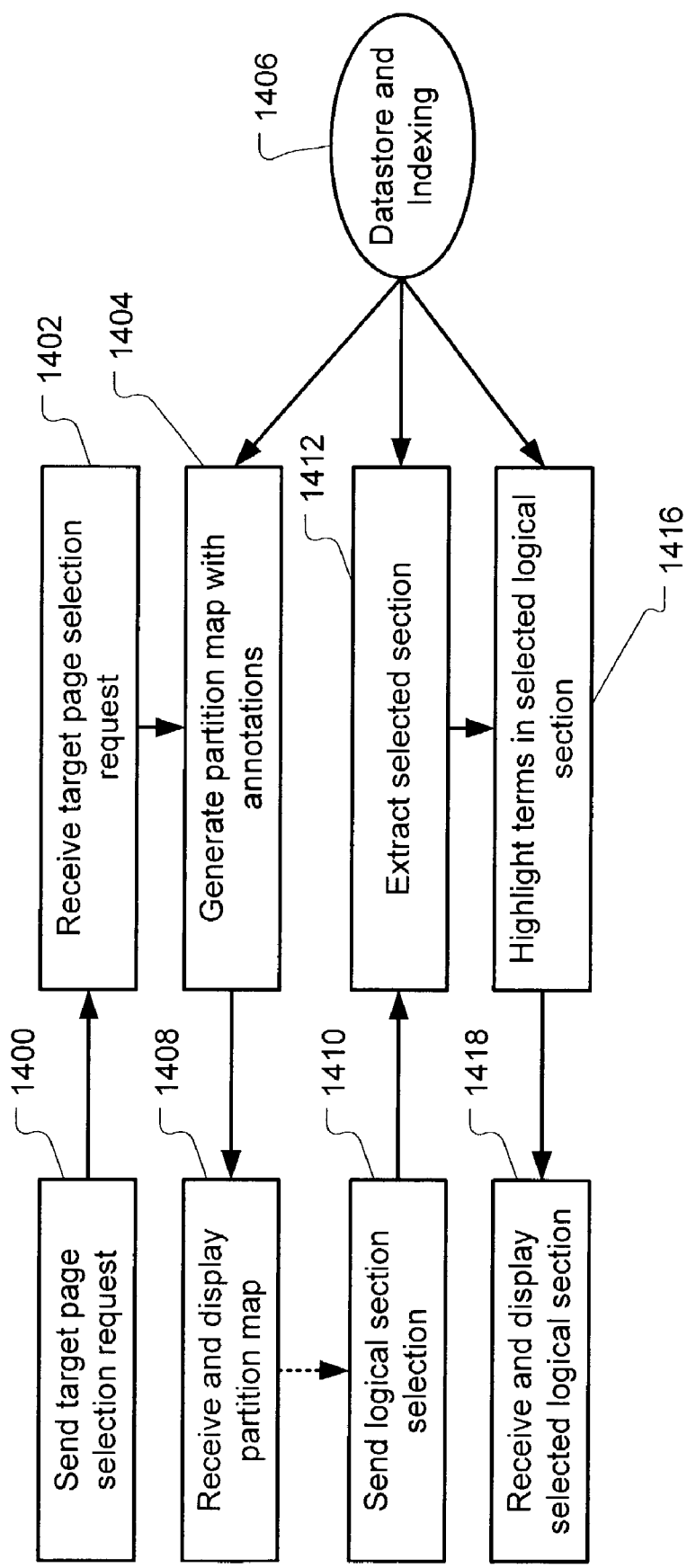
FIG. 14 illustrates operations for thumbnail marking and term highlighting in an embodiment of the present invention.

FIG. 14 illustrates operations for thumbnail marking and term highlighting in an embodiment of the present invention. With the analysis results of FIG. 12 stored in the cache, a user may select one of the search results or one of the corresponding progress tabs to view a SmartView mode of the corresponding search results target page (see e.g., FIG. 6). A sending operation 1400 sends a target page selection request to the server, which receives the target page selection request in receiving operation 1402. Based on the thumbnail image, the layout analysis results, the linguistics analysis results, and the search statistics analysis results stored a cache 1406, a partition map for the SmartView display of the selected search results target page is generated with annotations by a generation operation 1404 and sent to the client. A receiving and displaying operation 1408 receives the annotated partition map and displays it on the client in SmartView mode.

From the SmartView display, the user may select a logical section for display in detailed view mode. A sending operation 1410 sends the user's logical section selection to the server, which receives the selection and extracts and processes the corresponding logical section from the target page stored in the cache 1406. In an embodiment of the present invention, the extracted logical section is reformatted for a detailed view in accordance with the client's display, as shown in FIG. 2. A highlighting operation receives hit information from index stored in the cache 1406 and highlights the hits (e.g., terms satisfying the search criteria) in a selected logical section, which is sent to the client. A receiving and displaying operation 1418 receives the detailed view of the selected logical section and displays it on the client.

A Web search and a documents search in an embodiment of the present invention employ similar processes as described in FIGS. 12, 13, and 14. Furthermore, in either search embodiment, a local or remote search engine may be employed.

It should be understood that, while an exemplary embodiment has been described with regard to a handheld device, it is contemplated that non-handheld devices may be employed with alternative embodiments of the present invention. For example, the annotation of search results target pages and search result Web pages may be advantageously applied in smart phones, desktop computers, laptop computers, set-top boxes, Internet kiosks, and other client devices. Furthermore, many such client devices have sufficient computing resources to perform the operations of the server and/or the search engine locally.

Figure 15:
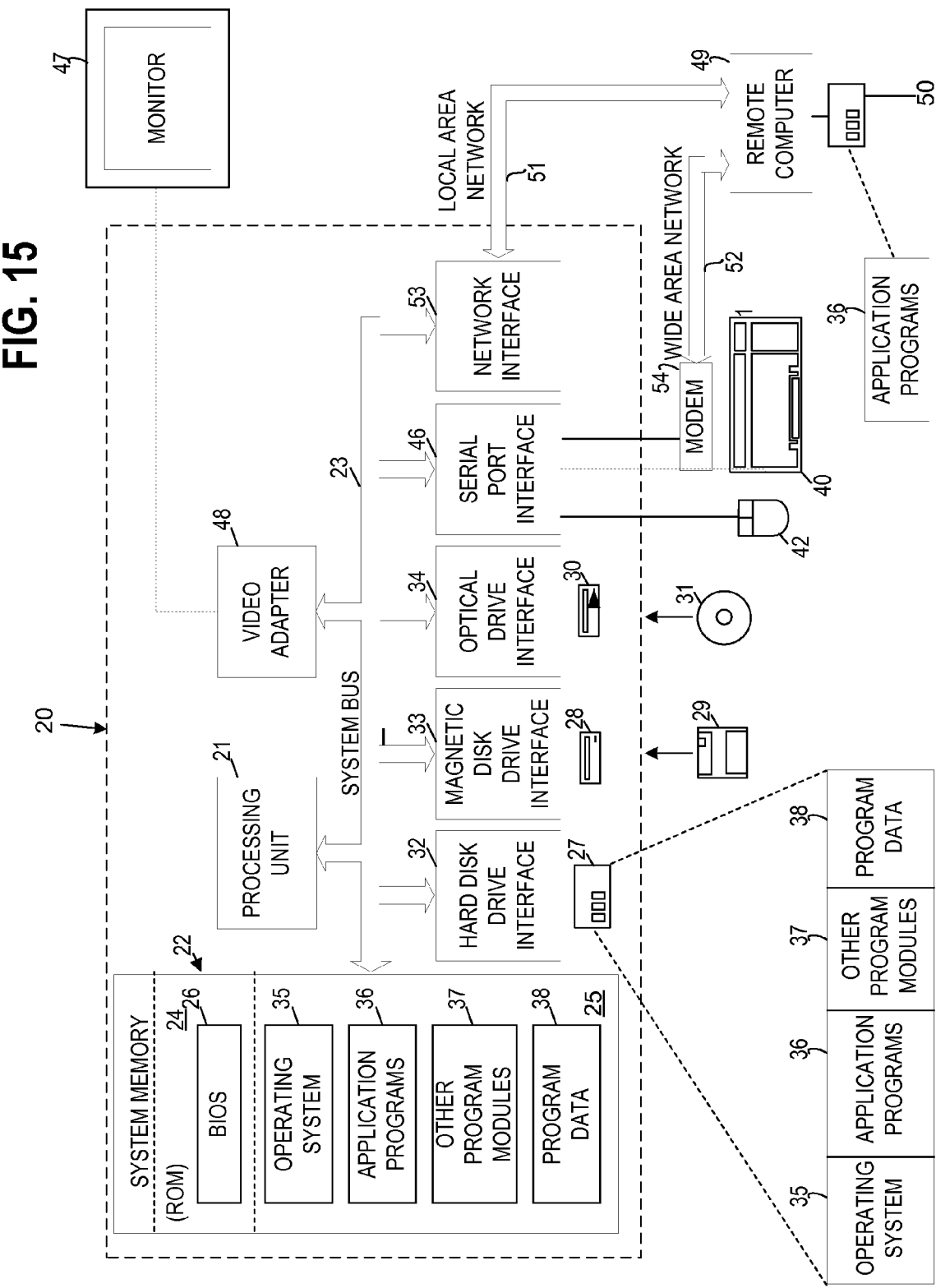
FIG. 15 illustrates an exemplary system useful for implementing an embodiment of the present invention.

The exemplary hardware and operating environment of FIG. 15 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a no server, a router, a network PC, a client, a peer device or other common network node, and typically includes many or all of the elements described above relative to the computer 20, although only a memory storage device 50 has been illustrated in FIG. 15. The logical connections depicted in FIG. 15 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a Web page partitioning module, a logical section reformatting module, a map generation module, a transmission module, a display module, a marking module, or a highlighting module may be incorporated as part of the operating system 35, application programs 36, or other program modules 37. The search statistics, received or rendered authoring language data, and a Web page partition map may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of annotating a representation of a search result target resource among a plurality of target resources identified in a resource search based on at least one search criterion, the method comprising:
   generating the representation of one of the search result target resource identified among the plurality of target resources identified in the resource search,
      wherein the search result target resource is not another plurality of target resources identified in a resource search based on at least one search criterion;
   performing layout analysis of the search result target resource to identify two or more logical sections of the search result target resource,
      wherein performing layout analysis comprises identifying two or more logical sections based on a physical display layout of the search result target resource,
      wherein a logical section of the two or more logical sections constitutes a target section;
   performing linguistic analysis of the search result target resource;
   associating at least a portion of the linguistic analysis with the target section;
   annotating the representation of the search result target resource with an annotation based on the linguistic analysis to indicate the target section includes an element that satisfies the at least one search criterion,
   wherein the annotating operation comprises determining a number of one or more hits contained in the target section, inserting into the representation of the search result target resource an annotation, the annotation indicating the number of the one or more hits contained in the target section, and the annotation farther indicating the target section which has the existence of the at least one hit;
   caching results of the layout analysis and the linguistic analysis for use by the annotating operation;
   reformatting resource data corresponding to the target section for display on an incompatible display,
      wherein reformatting comprises reformatting the target section with the annotation and the resource data that are modified based on the reformatting;
   automatically analyzing one or more other search result target resources among the plurality of target resources identified in the resource search based on the at least one search criterion, automatically analyzing including:
      determining whether each of the one or more other search result target resources is accessible;
      determining one or more annotations for the accessible one or more other search result target resources; and
   displaying a progress indicator for each of the one or more other search result target resources, each progress indicator indicating whether automatically analyzing is complete for one of the one or more other search result target resources, each progress indicator being selectable by a user to cause the one of the one or more other search result target resources to be displayed.

2. The method of claim 1 wherein the representation of the search result target resource includes a thumbnail image of the search result target resource.

3. The method of claim 1 wherein the search result target resource includes a Web page.

4. The method of claim 1 wherein the resource search includes a Web search performed by a Web search engine.

5. The method of claim 1 farther comprising:
   caching the search result target resource that includes the at least one logical section.

6. The method of claim 1 further comprising:
   caching the representation of the search result target resource.

7. The method of claim 1 further comprising:
   caching search statistics for the search result target resource relating to the resource search.

8. The method of claim 1 further comprising:
   generating a thumbnail image of a search results page that includes at least one search result referencing the at least one search result target resource; and
   annotating the thumbnail image of the search results page to indicate a relative strength of the at least one search result.

9. The method of claim 1 further comprising:
   receiving a selection of an annotated logical section defined in the representation of the search result target resource;
   extracting resource data corresponding to the annotated logical section from the search result target resource;
   annotating the resource data corresponding to the annotated logical section to highlight an element satisfying the at least one search criterion.

10. The method of claim 9 further comprising:
    reformatting the resource data corresponding to the annotated logical section for display on an incompatible display.

11. The method of claim 1 wherein the resource search includes a search through cached data from a previous resource search.

12. The method of claim 11 wherein an element that satisfies the at least one search criterion constitutes a hit, the cached data includes at least one search result target page, and further comprising:
    annotating a logical section of the search result target page to indicate that the logical section contains the most hits for display in a detailed view mode.

13. The method of claim 1 further comprising: creating a searchable inverted index from the linguistic analysis of content elements of the search result target resource.

14. The method of claim 1 further comprising:
    performing statistical analysis of the target section of the search result target resource; and
    creating a searchable inverted index from the statistical analysis of content elements of the search result target resource.

15. The method of claim 1 further comprising:
    performing statistical analysis of the target section of the search result target resource; and
    caching results of the layout analysis and the statistical analysis for use by the annotation operation.

16. The method of claim 1 further comprising:
    creating a searchable inverted index from the linguistic analysis of content elements of the search result target resource; and
    associating at least a portion of the searchable inverted index with the target section.

17. The method of claim 1 further comprising:
    performing statistical analysis of the search result target resource;
    creating a searchable inverted index from the statistical analysis of content elements of the search result target resource; and
    associating at least a portion of the searchable inverted index with the target section.

18. A computer program product encoding a computer program on a computer readable storage medium that when executed on a computer system executes a computer process for annotating a representation of a search result target resource among a plurality of target resources identified in a resource search based on at least one search criterion, the computer process comprising:

generating the representation of one of the search result target resource identified among the plurality of target resources identified in the resource search,
wherein the search result target resource is not another plurality of target resources identified in a resource search based on at least one search criterion;
performing layout analysis, on the computer system, of the search result target resource to identify two or more logical sections of the search result target resource,
wherein performing layout analysis comprises identifying two or more logical sections based on a physical display layout of the search result target resource,
wherein a logical section of the two or more logical sections constitutes a target section;
performing linguistic analysis of the search result target resource;
associating at least a portion of the linguistic analysis with the target section;
annotating the representation of the search result target resource with an annotation based on the linguistic analysis to indicate the target section includes an element that satisfies the at least one search criterion,
wherein the annotating operation comprises determining a number of one or more hits contained in the target section, inserting into the representation of the search result target resource an annotation, the annotation indicating the number of the one or more hits contained in the target section, and the annotation further indicating the target section which has the existence of the at least one hit;
reformatting resource data corresponding to the target section section for display on an incompatible display,
wherein the reformatting modifies the resource data and the annotation in the target section;
automatically analyzing one or more other search result target resources among the plurality of target resources identified in the resource search based on the at least one search criterion, automatically analyzing including:
determining whether each of the one or more other search result target resources is accessible;
determining one or more annotations for the accessible one or more other search result target resources; and
displaying a progress indicator for each of the one or more other search result target resources, each progress indicator indicating whether automatically analyzing is complete for one of the one or more other search result target resources, each progress indicator being selectable by a user to cause the one of the one or more other search result target resources to be displayed.

19. The computer program product of claim 18 wherein the representation of the search result target resource includes a thumbnail image of the search result target resource.

20. The computer program product of claim 18 wherein the search result target resource includes a Web page.

21. The computer program product of claim 18 wherein the resource search includes a Web search performed by a Web search engine.

22. The computer program product of claim 18 wherein the computer process further comprises:
caching results of the layout analysis and the linguistic analysis for use by the annotating operation.

23. The computer program product of claim 18 wherein the computer process further comprises:
caching the search result target resource that includes the at least one logical section.

24. The computer program product of claim 18 wherein the computer process further comprises:
caching the representation of the search result target resource.

25. The computer program product of claim 18 wherein the computer process further comprises:
caching search statistics for the search result target resource relating to the resource.

26. The computer program product of claim 18 wherein the computer process further comprises:
generating a thumbnail image of a search results page that includes at least one search result referencing the at least one search result target resource; and
annotating the thumbnail image of the search results page to indicate a relative strength of the at least one search result.

27. The computer program product of claim 18 wherein the computer process further comprises:
receiving a selection of an annotated logical section defined in the representation of the search result target resource;
extracting resource data corresponding to the annotated logical section from the search result target resource;
annotating the resource data corresponding to the annotated logical section to highlight an element satisfying the at least one search criterion.

28. The computer program product of claim 27 wherein the computer process further comprises:
reformatting the resource data corresponding to the annotated logical section for display on an incompatible display.

29. The computer program product of claim 22 wherein the resource search includes a search through cached data from a previous resource search.

30. The computer program product of claim 29 wherein an element that satisfies the at least one search criterion constitutes a hit, the cached data includes at least one search result target resource page, and further comprising:
annotating a logical section of the search result target page to indicate that the logical section contains the most hits for display in a detailed view mode.

31. The computer program product of claim 18 wherein the computer process further comprises:
creating a searchable inverted index from the linguistic analysis of content elements of the search result target resource.

32. The computer program product of claim 18 wherein the computer process further comprises:
performing statistical analysis of the target section of the search result target resource; and
creating a searchable inverted index from the statistical analysis of content elements of the search result target resource.

33. The computer program product of claim 18 wherein the computer process further comprises:
performing statistical analysis of the target section of the search result target resource; and
caching results of the layout analysis and the statistical analysis for use by the annotation operation.

34. The computer program product of claim 18 wherein the computer process further comprises:
creating a searchable inverted index from the linguistic analysis of content elements of the search result target resource; and associating at least a portion of the searchable inverted index with the target section.

35. The computer program product of claim 18 wherein the computer process further comprises:
   performing statistical analysis of the search result target resource;
   creating a searchable inverted index from the statistical analysis of content elements of the search result target resource; and
   associating at least a portion of the searchable inverted index with the target section.

36. A resource search apparatus for annotating a representation of a search result target resource among a plurality of target resources identified in a resource search based on at least one search criterion, the resource search apparatus comprising:
   an image generator creating the representation of the search result target resource identified among the plurality of target resources identified in the resource search,
      wherein the search result target resource is not another plurality of target resources identified in a resource search based on at least one search criterion;
   a computer implemented layout analysis module analyzing the layout of the search result target resource to identify two or more logical sections of the search result target resource,
      wherein the layout analysis module identifies the two or more logical section based on a physical display layout of the search result target resource,
      wherein a logical section of the two or more logical sections constitutes a target section;
   a linguistics analysis module performing linguistic analysis of the search result target resource;
   an annotation module annotating the representation of the search result target resource with an annotation based on the linguistic analysis to indicate the target section includes an element that satisfies the at least one search criterion,
   a memory configured to cache results of the layout analysis and the linguistic analysis for use by the annotating operation;
   a display formatting module that reformats resource data corresponding to the target section for display on an incompatible display,
      wherein the reformatting reformats both the annotation and the resource data in the target section;
   an annotation module configured to automatically analyze one or more other search result target resources among the plurality of target resources identified in the resource search based on the at least one search criterion, the annotation module including:
      a first determiner configured to determine whether each of the one or more other search result target resources is accessible;
      a second determiner configured to determine one or more annotations for the accessible one or more other search result target resources; and
   a display unit configured to display a progress indicator for each of the one or more other search result target resources, each progress indicator indicating whether automatically analyzing is complete for one of the one or more other search result target resources, each progress indicator being selectable by a user to cause the one of the one or more other search result target resources to be displayed.

37. The resource search apparatus of claim 36 wherein the representation the search result target resource includes a thumbnail image of the search result target resource.

* * * * *